Patented Aug. 28, 1928.

1,682,588

UNITED STATES PATENT OFFICE.

GUSTAV WIETZEL AND FRITZ STOEWENER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PRODUCTION OF DRY GASES.

No Drawing. Application filed June 29, 1925, Serial No. 40,440, and in Germany June 30, 1924.

The present invention relates to the production of dry gases in connection with the liquefaction of the gases at low temperatures and at high pressures.

In the liquefaction of gases it is an impediment that it is extremely difficult to completely dry the gases, even when employing dehydrated calcium chlorid and the like, which fact leads to gradual deposition of ice at the very low temperatures prevailing in the apparatus used for liquefying the gases and at length to complete stopping up. Drying by means of low temperatures with the aid of liquid ammonia also leaves sufficient water vapor in the gases to cause trouble by the formation of ice. In either case the ice choking the apparatus or pipes, must be melted away at intervals which is a troublesome work consuming power and not entirely free of danger.

We have found that this trouble can be avoided by passing the gases, preferably after drying them with the aid of the usual methods and after they have been brought under the pressure required for liquefaction, through highly porous adsorbent inorganic bodies such for example as silica gel, natural or artificial zeolites, or other bodies of a gel nature, silicates or the like. Such bodies exert an extremely efficient drying action removing the last traces of water vapor in a reliable and safe way. The treatment with the said substances is effected after the gases have been subjected to fore-cooling and at the low temperature employed therefor. When the adsorbents have taken up a certain amount of water, they become exhausted and regeneration will become necessary which can be done in any suitable maner. Regeneration may, for example, be effected by passing through the exhausted mass dry gases at ordinary or moderately elevated pressure and very properly the gases which remain in a gaseous state after the liquefying treatment are used for said regeneration or, when the liquid gas is subjected to fractional distillation, part of the gases obtained thereby, whether pure constituents or still mixtures, may be used, as such gases ordinarily are under atmospheric or moderately elevated pressure and are also completely dry from a practical point of view. Accordingly they have a strong drying property and the adsorbents are to a large extent freed from adsorbed water when treated with such gases. Regeneration may take place at the temperature of fore-cooling when any loss of cold will be avoided, but it may also be effected at a higher temperature.

What we claim is:

1. The process of liquefying gases which consists in drying and compressing the gases, cooling them and adsorbing any residual water vapor by means of an inorganic substance of high adsorbing power, and liquefying the gases and regenerating the adsorbent at intervals by means of gases which have undergone the liquefaction operation and are at a pressure not substantially exceeding atmospheric pressure.

2. The process of liquefying gases which consists in drying and compressing the gases, cooling them and adsorbing any residual water vapor by means of silica gel of high adsorbing power, and liquefying the gases and regenerating the adsorbent at intervals by means of gases which have undergone the liquefaction operation and are at a pressure not substantially exceeding atmospheric pressure.

In testimony whereof we have hereunto set our hands.

GUSTAV WIETZEL.
FRITZ STÖWENER.